United States Patent [19]
Keller

[11] Patent Number: 5,188,564
[45] Date of Patent: Feb. 23, 1993

[54] LUBRICATION DEVICE FOR UNIVERSAL JOINT ASSEMBLY

[75] Inventor: Thomas J. Keller, Cridersville, Ohio
[73] Assignee: Dana Corporation, Toledo, Ohio
[21] Appl. No.: 676,676
[22] Filed: Mar. 28, 1991
[51] Int. Cl.$^5$ .......................... F16C 1/24; F16J 15/02
[52] U.S. Cl. ...................... 464/14; 277/208; 464/133
[58] Field of Search .............. 464/11, 14, 128–133, 464/136; 277/208

[56] References Cited

U.S. PATENT DOCUMENTS

| | | | |
|---|---|---|---|
| Re. 30,790 | 11/1981 | Lewis | 464/14 |
| 895,149 | 8/1908 | Blood | 464/14 |
| 1,492,351 | 4/1924 | Burns | 464/17 |
| 1,949,500 | 3/1934 | Swenson | 464/14 |
| 3,470,711 | 10/1969 | Kayser | 464/14 |
| 4,047,396 | 9/1977 | McElwain et al. | 464/14 |
| 4,103,512 | 8/1978 | McElwain et al. | 464/14 |
| 4,445,875 | 5/1984 | Kosuda et al. | 464/14 |
| 4,650,440 | 3/1987 | Fisher | 464/14 |

Primary Examiner—Daniel P. Stodola
Assistant Examiner—William G. Battista, Jr.
Attorney, Agent, or Firm—Frank B. McDonald

[57] ABSTRACT

A "standpipe" lubrication device for a universal joint assembly. In a preferred form, the lubrication device includes a plurality of annular protuberances on opposed first and second ends. The protuberances, serving as sealing and tolerance absorption media, define adjoining frustoconical and cylindrical surfaces. Each cylindrical surface terminates in a radially extending annular surface, the latter adapted to provide a self-locking feature against dislodgement of the device from a lubrication passage of the trunnion. Also in the same preferred form, the lubrication device is formed of a moldable material characterized by dimensional heat stability, for assuring proper operation at elevated temperatures.

11 Claims, 1 Drawing Sheet

LUBRICATION DEVICE FOR UNIVERSAL JOINT ASSEMBLY

BACKGROUND OF INVENTION

This invention relates generally to lubrication of universal joint assemblies for vehicular as well as industrial use. More particularly, the invention relates to apparatus for enhancing lubrication of needle bearings positioned between trunnions or journals of a universal joint cross member and cylindrical bearing caps supported on the trunnions.

The typical universal joint assembly includes a cross member having four trunnions extending radially outwardly along two perpendicular axes from a central body of the cross member. The ends of the trunnions are rotatably supported on needle bearings contained in bearing cups supported, in turn, by pairs of lugs of two connecting yokes, each yoke coupling separate shafts in a drivetrain. The central body of the cross member has an internal cavity from which internal lubrication passages extend radially through each of the four trunnions. A grease fitting located on the exterior of the central body of the cross member communicates directly with the internal cavity for suppling lubrication into the four passages. Thus, lubrication grease forced into the internal cavity via the grease fitting must travel through the passages to reach the needle bearings.

After a universal joint has been subjected to rotary motion for a period of time, the temperature of the grease will have risen, and the grease will tend to flow freely as a low viscosity liquid. In a typical driveline, the cross member rotates in a generally vertical plane. Upon stopping the joint, unless checked by valves the liquid grease will drain, from one or two of the bearing cups arrested in upper positions, down through the internal passages of the cross member and into the lower cups. If the joint remains idle for a period of time, the grease will cool and congeal back into solid form. Later, upon initial rotation of the joint, the upper cup or cups which have been emptied of lubrication will be subjected to increased wear until such time that the grease can again become liquid to permit adequate flow-back into the affected cup or cups.

Numerous attempts have been made in the prior art to overcome this problem. For example, check valves have been installed in each of the lubrication passages to enable grease to flow only radially outwardly toward the trunnion ends, but not inwardly. However, many of these devices suffer from inoperative or defective valve apparatus. In some instances the grease may not reach all of the trunnion ends in a uniform manner, particularly where wide variations exist in the amount of force required for the grease to pass through the various check valve devices.

Several attempted solutions have involved the use of "standpipe" devices, wherein one end of a tubular structure extends into the lubrication passage of each trunnion, the other end extending into a reservoir in the trunnion end. The intent is to capture or trap a certain amount of lubrication in the reservoir during idle periods. A major problem in the use of such devices relates to sufficient sealing of the standpipe member in the trunnion lubrication passage under typical tolerance variations, and particularly at elevated temperatures. Typical plastic standpipes have a tendency to soften and become dislodged when heated, wherein such devices become ineffective by permitting liquid grease to flow between the standpipe and lubrication passage.

SUMMARY OF THE INVENTION

The device of the present invention is an improved lubrication standpipe effective to retain grease in the trunnions of the upper bearing cups during the time the universal joint is stationary, and particularly while the grease remains in liquid form. The standpipe includes no check valves, or other restrictions which give rise to the lubrication problems of the prior art. The improved standpipe lubrication device of the present invention provides an effective seal against flow-back of liquid grease even under elevated temperatures.

In a preferred form, the lubricant device has an elongate tubular body defining first and second ends spaced along an axis. The body is adapted for insertion of either end into the lubrication passage of a trunnion. The tubular body has a radially extending positioning flange intermediate the ends. The positioning flange is adapted to limit the amount of insertion of the tubular body to the length of the end being inserted. Each end comprises at least one annular deformable protuberance which serves as both an effective seal and a tolerance absorption member.

In a preferred form, a plurality of axially spaced protuberances comprise fluid sealing and tolerance absorption media, whereby the inserted end of the tubular body is frictionally retained in a self-locking manner within the lubrication passage under a predetermined range of dimensional tolerance between diameters of the inserted end and the passage.

DETAILED DESCRIPTION OF THE PREFERRED EMBODIMENT

Figure 1:
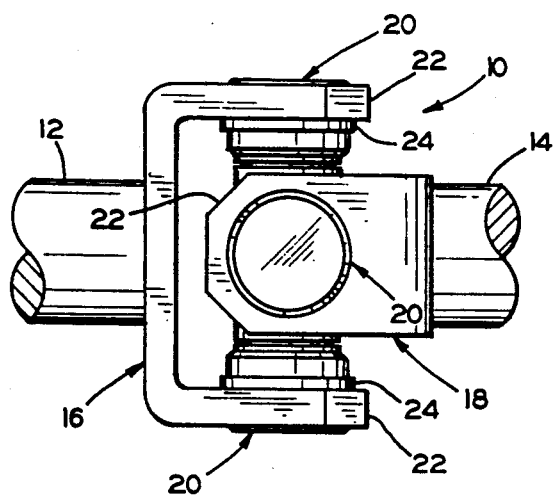
FIG. 1 is a side elevational view of a universal joint assembly which embodies the present invention.

Referring initially to FIG. 1, a universal joint assembly 10 provides a coupling for a pair of angularly offset, rotary drive and driven shafts 12 and 14, respectively. The assembly 10 incorporates a pair of yokes 16 and 18 which contain bearing cups 20 held in lugs 22 via retaining rings 24.

Figure 2:
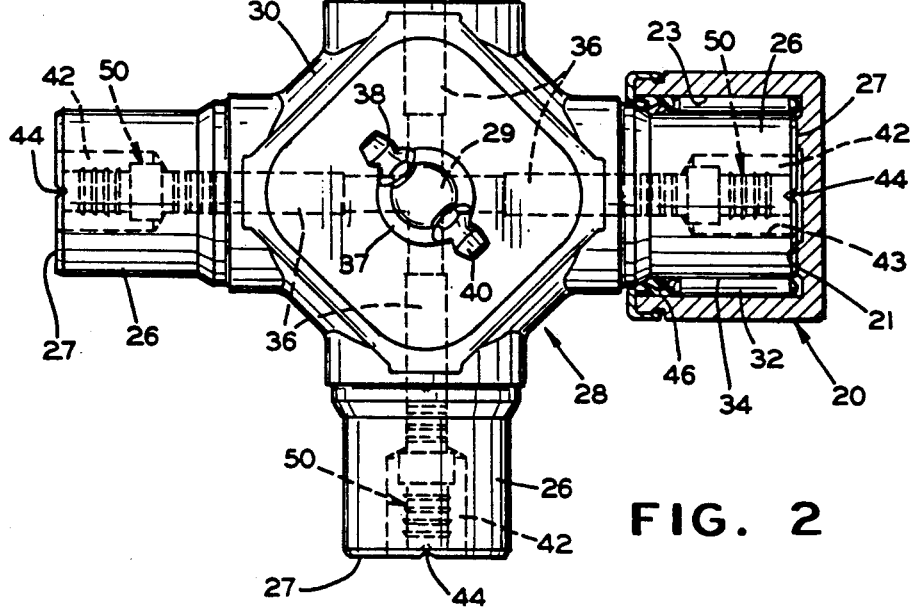
FIG. 2 is an cross-sectional (in part), elevational face view of a cross member, showing only one bearing cup (of a set of four) positioned on one of the trunnions of the universal joint of FIG. 1.

Referring to FIG. 2, four bearing cups 20 (only one shown) are rotatably mounted on four trunnions (also variously called journals) 26 which extend radially from a central body 30 of a cross member 28 as shown. A lubrication passage 36 extends through the center of each radially extending trunnion 26, outwardly from an internal cavity 29 of the central body 30. The body 30 contains a lubricant fitting 37 having a pair of obliquely angled external nipples 38 and 40 designed to permit one-way flows of lubricant directly into the internal cavity 29, and hence to the passages 36. Thus, the assembly 10 is designed to be periodically relubricated for longevity and proper operation.

Each passage 36 terminates into a lubrication cavity 42 in the extremity 27 of each trunnion 26. Each cavity 42 is defined by a counterbore 43 sized to hold adequate lubrication between periods of operation. The lubrication system provides for the grease to pass through the passages 36, into the cavities 42, and ultimately into the interior of the bearing cups 20. For this purpose, the extremities 27 of the trunnions 26 have grooves 44 which extend radially outwardly to facilitate flows of liquid grease. The grease travels through the grooves 44 to lubricate a plurality of needle bearings 32 situated between the interior cylindrical surface 23 of each cup and the exterior cylindrical surface 34 of each trunnion. The grease is retained within each cup by a double lip seal 46 (only one of which is shown) situated between each cup and trunnion.

During its useful life, the typical universal joint assembly 10 will be subjected to periods of non-operation, wherein the assembly will remain at rest with one or two of the trunnions in an upper position relative to the others. During any previous operation in which the grease has become liquid, and to the extent that liquid grease has a relatively low viscosity, the grease will have a tendency to drain down through the higher positioned passages 36 and into the low cup or cups 20 by force of gravity whenever joint rotation ceases. After any substantial period of idleness, the grease cools, congeals, and become viscus prior to resumption of vehicular operation. Upon resumption of rotation, the initial tendency is for the grease to remain in the cup or cups to which it has drained until it again becomes liquid. Further, centrifugal force will act on the joint assembly 10, to retain the grease in that cup or cups. These combined effects may result in starvation of lubrication to at least one or two of the cups during the initial part of resumed operation, with the result that wear of the assembly 10 may be substantially accelerated.

Figure 3:
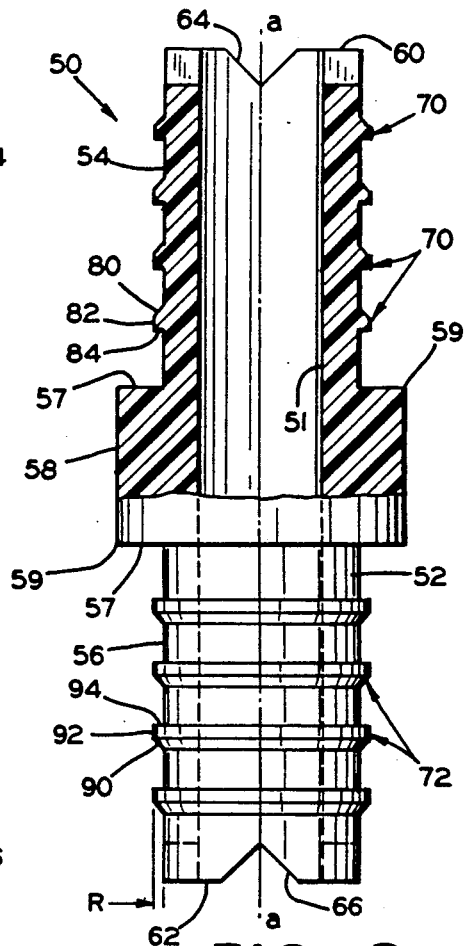
FIG. 3 is an enlarged view of a standpipe lubrication device constructed in accordance with the present invention, the upper half of the device depicted in cross-section.

Referring now also to FIG. 3, the present invention provides a standpipe lubrication device 50 which defines an elongate tubular body 52 having reversely identical first and second ends 54 and 56 extending along an axis "a—a". The body is adapted for insertion of either end into the lubrication passage 36 extending through each trunnion 26. Intermediate the first and second ends 54, 56 is a radially extending positioning flange 58. In a preferred form, the flange is symmetrically positioned between the two ends, and operates to limit the amount insertion of the tubular body 52 to the length of either inserted end 54 or 56, as appropriate.

Each counterbore 43 (FIG. 2) contains a frustoconical base 48 which interfaces with an associated lubrication passage 36. The flange 58 of each lubrication device 50 defines a pair of radially extending locator bases 57, each base facing one end 54 or 56 of the body 52. Each locator base 57 defines a circumferential edge 59 which makes a circular line contact with the base 48 of the counterbore 43. Such contact between the locator base 57 and associated counterbore base 48 is strictly for limiting insertion of an end 54, 56; i.e., for positioning. No lubrication sealing is effected nor required by such contact, as the latter function is carried out entirely by protuberances 70 and 72 as described hereafter. In preferred form, both ends 54 and 56 include pluralities of radially extending notches 64 and 66, respectively, in their respective extremities 60 and 62. The notches facilitate radial flows of liquid grease to the bearings even though the extremities 60, 62 of the device 50 may contact the internal bottom 21 of the bearing cup 20.

Each end 54, 56 is defined by a length which extends between an extremity 60, 62 and a locator base 57 most proximal to that particular extremity. Axially distributed along the ends 54, 56 are pluralities of annular, deformable protuberances 70, 72, respectively. The protuberances are symmetrical both axially along and circumferentially about the axis "a—a" of the tubular body 52. The diameters of the protuberances are sized to be greater than both the diameters of the tubular body 52 and the passage 36 into which one end 54, 56 of the body is inserted. Those skilled in the art will appreciate that the protuberances are designed so as to be self-lockingly insertable; that is, the protuberances 70, 72, on respective ends 54 and 56, are arranged to present a frustoconical surface 80, 90 which faces away from the positioning flange 58 and toward the extremity 60 or 62 being inserted. Adjoining the frustoconical surfaces 80, 90 of respective ends 70 and 72 are cylindrical surfaces 82, 92, the latter defining radially extending annular surfaces or lips 84, 94 which face the positioning flange 58. The nature of the protuberance after insertion into a passage 36 is to resist forces tending to remove or dislodge the device 50 from the passage 36. This self-locking feature will obviate any tendency for the notches 64, 66 to become worn down by frictional rubbing of the extremities 60, 62 against the bottoms 21 of the bearing cups under centrifugal forces of rotation. The latter phenomenon, which leads to oil starvation, has contributed to failures of prior art joint assemblies.

For the protuberances to be most effective, they are preferably made of a moldable elastic material, such as a plastic or nylon particularly compounded for and characterized by dimensional heat stability. Preferably, the protuberances are integral to the tubular body 52, having a diameter sufficiently greater than that of the body 52 to absorb tolerances between the passage 36 and the external diameter of the body 52. One preferred material possessing the requisite heat stability is made and sold under the tradename "Zytel ®" by E.I. Du Pont de Nemours, Inc.

To the extent that either end 54 or 56 of the device 50 may conveniently be inserted into a passage 36, it will appreciated by those skilled in the art that the respective sets of lips 84 and 94 of the protuberances 70 and 72 will face opposite directions. It will be appreciated by those skilled in the art that the protuberances 70, 72 will be subjected to deformation upon insertion of the ends 54 and 56 into the passage 36. Thus either end 54, 56 will provide a frictional retention system adapted to absorb tolerance, and yet be capable of sealing against liquid lubrication flows between the body 52 and the lubrication passage 36 under a pre-determined range of dimensional variance between the latter structures.

EXAMPLE

A prototype lubrication standpipe device 50 has a length of 1.31 inch. The positioning flange 58 has a diameter of 0.44 inch. Each tubular end 54, 56 has an overall outside diameter of 0.300 inch with a total permitted tolerance of 0.010 inch while the protuberances 70 and 72 are 0.330 inch, also with a permitted tolerance range of 0.010 inch. Thus, those skilled in the art will appreciate that the radial dimensional difference "R" (FIG. 3) between the protuberances 70, 72 and the exterior surface of the body 52 is approximately 0.015 inch.

The diameter of the counterbore 43, which defines the extremity of the lubrication cavity 42, is approximately 0.62 inch. The diameter of the internal passage 36 is 0.3135 inch with a tolerance of 0.013 of an inch. The cylindrical surface 82, 92 has an axial length of 0.020 inch. The adjoining frustoconical surfaces 80 and 90 extend at a 30 degree angle, measured with respect to axis "a—a". The internal bore 51 extending through the body 52 has a diameter of 0.19 inch. Finally, the length of each end 54, 56 is 0.530 inch.

Although only one preferred embodiment has been detailed and described herein, the following claims are envisioned to cover numerous additional embodiments which will fall within the spirit and scope thereof.

What is claimed:

1. A lubrication device for a universal joint assembly, said device comprising an elongate tubular body defining first and second ends spaced along an axis, at least one of said ends being adapted for insertion into a journal lubrication passage of a universal joint cross member, said body comprising at least one deformable annular protuberance on said one end, said protuberance extending radially about said one end, said body further comprising a radially extending positioning flange intermediate said ends, said flange limiting the extent of insertion of said body into said passage, wherein said flange is axially spaced from said protuberance.

2. The lubrication device of claim 1 wherein said protuberance comprises sealing and dimensional tolerance absorption means between said one end and said passage, whereby said one end of said body may be frictionally retained within said lubrication passage under a pre-determined range of dimensional tolerance between said one end and said passage.

3. The lubrication device of claim 2 wherein said protuberance is integrally formed within said one end of said body.

4. The lubrication device of claim 3 wherein said protuberance defines a frustoconical surface extending circumferentially about said end.

5. The lubrication device of claim 4 wherein each protuberance further defines a radially extending annular surface facing said positioning flange.

6. The lubrication device of claim 5 wherein a plurality of said protuberances are axially spaced along said one end.

7. The lubrication device of claim 6 wherein said frustoconical surfaces are angled to face away from said positioning flange and toward the extremity of said one end.

8. The lubrication device of claim 7 wherein both said first and second ends of said body comprise said protuberances.

9. The lubrication device of claim 8 wherein said annular surfaces of each protuberance of said first end all face one direction, and wherein said annular surfaces of said protuberances of said second end all face a second, opposite, direction.

10. The lubrication device of claim 9 wherein said body is formed of a moldable material characterized by dimensional heat stability.

11. The lubrication device of claim 10 wherein said annular surfaces of said protuberances comprise self-locking means after one of said ends is inserted into a journal lubrication passage, wherein said protuberances of said inserted end will resist axial forces tending to dislodge said inserted end from said passage.

* * * * *